(12) United States Patent
Matsumoto et al.

(10) Patent No.: US 10,543,684 B2
(45) Date of Patent: Jan. 28, 2020

(54) INK JET RECORDING DEVICE (71) Applicants: KAO CORPORATION, Tokyo (JP); THINK LABORATORY CO., LTD., Kashiwa-shi, Chiba (JP)

(72) Inventors: Yuta Matsumoto, Cincinnati, OH (US); Kazuki Watanabe, Sapporo (JP); Yasufumi Ueda, Wakayama (JP); Tatsuo Shigeta, Nagareyama (JP)

(73) Assignees: KAO CORPORATION, Tokyo (JP); THINK LABORATORY CO., LTD., Kashiwa-Shi (JP)

( * ) Notice: Subject to any disclaimer, the term of this patent is extended or adjusted under 35 U.S.C. 154(b) by 0 days.

(21) Appl. No.: 16/077,159

(22) PCT Filed: Feb. 2, 2017

(86) PCT No.: PCT/JP2017/003867
§ 371 (c)(1),
(2) Date: Aug. 10, 2018

(87) PCT Pub. No.: WO2017/138437
PCT Pub. Date: Aug. 17, 2017

(65) Prior Publication Data
US 2019/0039373 A1 Feb. 7, 2019

(30) Foreign Application Priority Data

Feb. 12, 2016 (JP) .................................. 2016-025355
Mar. 14, 2016 (JP) .................................. 2016-049932

(51) Int. Cl.
*B41J 2/135* (2006.01)
*B41J 11/02* (2006.01)
(Continued)

(52) U.S. Cl.
CPC ............... *B41J 2/135* (2013.01); *B41J 11/02* (2013.01); *B41M 5/0011* (2013.01); *C09D 11/322* (2013.01); *C09D 11/40* (2013.01)

(58) Field of Classification Search
CPC ........ B41J 11/002; B41J 15/16; B41M 7/009; B41M 5/0011
(Continued)

(56) References Cited

U.S. PATENT DOCUMENTS

2003/0149130 A1 8/2003 Kondo
2003/0169322 A1 9/2003 Shima et al.
(Continued)

FOREIGN PATENT DOCUMENTS

CN 101701115 A 5/2010
CN 101835618 A 9/2010
(Continued)

OTHER PUBLICATIONS

International Search Report (PCT/ISA/210) for International Application No. PCT/JP2017/003866, dated Apr. 11, 2017.
(Continued)

*Primary Examiner* — An H Do
(74) *Attorney, Agent, or Firm* — Birch, Stewart, Kolasch & Birch, LLP (57) ABSTRACT The present invention relates to an ink-jet printing apparatus that is capable of obtaining printed materials that are free of occurrence of color migration and have good appearance even when printed on a resin printing medium using a water-based ink, and an ink-jet printing method. The present invention provides an ink-jet printing apparatus including an ink-jet printing head that ejects a water-based ink onto a resin printing medium that is transported in a feeding direction thereof, and an under heater that heats the printing medium from a rear side surface of the printing medium
(Continued)

opposed to a front side surface thereof which faces to the ink-jet printing head, in which the under heater is disposed at a position spaced at a distance of from 0.05 to 3.0 mm apart from the rear side surface of the printing medium upon printing, and an ink-jet printing method using the ink-jet printing apparatus.

9 Claims, 2 Drawing Sheets

(51) Int. Cl.
 B41M 5/00 (2006.01)
 C09D 11/322 (2014.01)
 C09D 11/40 (2014.01)
(58) Field of Classification Search
 USPC .................................. 347/101, 102, 104
 See application file for complete search history.

(56) References Cited

U.S. PATENT DOCUMENTS

| | | |
|---|---|---|
| 2009/0081423 A1 | 3/2009 | Sano |
| 2010/0009136 A1 | 1/2010 | Oyanagi et al. |
| 2010/0302300 A1 | 12/2010 | Verdonck |
| 2011/0037804 A1 | 2/2011 | Oyanagi et al. |
| 2012/0062640 A1 | 3/2012 | Uraki et al. |
| 2013/0096225 A1 | 4/2013 | Verdonck |
| 2013/0182057 A1 | 7/2013 | Koase |
| 2014/0132684 A1 | 5/2014 | Ohta |
| 2014/0375734 A1 | 12/2014 | Takeuchi et al. |
| 2015/0054883 A1 | 2/2015 | Okuda et al. |
| 2015/0097906 A1 | 4/2015 | Beier et al. |
| 2015/0191031 A1 | 7/2015 | Ohta et al. |
| 2015/0197654 A1 | 7/2015 | Okuda et al. |
| 2016/0090483 A1 | 3/2016 | Fukuroi et al. |
| 2016/0130453 A1 | 5/2016 | Eguchi et al. |
| 2016/0159110 A1 | 6/2016 | Beier et al. |
| 2019/0030918 A1* | 1/2019 | Matsumoto ............ B41J 11/002 |

FOREIGN PATENT DOCUMENTS

| | | |
|---|---|---|
| CN | 104661625 A | 5/2015 |
| CN | 104774504 A | 7/2015 |
| CN | 104816545 A | 8/2015 |
| CN | 204526443 U | 8/2015 |
| CN | 105229085 A | 1/2016 |
| JP | S58-188685 A | 11/1983 |
| JP | S64-11841 A | 1/1989 |
| JP | H02-162045 A | 6/1990 |
| JP | 2003-182061 A | 7/2003 |
| JP | 2003-260866 A | 9/2003 |
| JP | 2004-18546 A | 1/2004 |
| JP | 2004-181816 A | 7/2004 |
| JP | 2008-44367 A | 2/2008 |
| JP | 2008-200850 A | 9/2008 |
| JP | 2008-200856 A | 9/2008 |
| JP | 2009-56613 A | 3/2009 |
| JP | 2009-221283 A | 10/2009 |
| JP | 2010-106374 A | 5/2010 |
| JP | 2010-137519 A | 6/2010 |
| JP | 2010-158861 A | 7/2010 |
| JP | 2010-201714 A | 9/2010 |
| JP | 2013-10364 A | 1/2013 |
| JP | 2013-52577 A | 3/2013 |
| JP | 2013-154612 A | 8/2013 |
| JP | 2013-166271 A | 8/2013 |
| JP | 2014-47302 A | 3/2014 |
| JP | 2014-094495 A | 5/2014 |
| JP | 2015-128826 A | 7/2015 |
| JP | 2015-182348 A | 10/2015 |
| JP | 2015-183112 A | 10/2015 |
| JP | 2016-221781 A | 12/2016 |
| WO | 2014/196578 A1 | 12/2014 |

OTHER PUBLICATIONS

International Search Report (PCT/ISA/210) for International Application No. PCT/JP2017/003869, dated Feb. 28, 2017, with an English translation.
International Search Report (PCT/ISA/210) for International Application No. PCT/JP2017/003870, dated Feb. 28, 2017.
International Search Report for PCT/JP2017/003867 (PCT/ISA/210) dated Mar. 28, 2017.
Chinese Office Action and Search Report, dated Jul. 1, 2019, for Chinese Application No. 201780010856.9, with English translation of the Chinese Office Action.
Extended European Search Report dated Sep. 11, 2019, for European Patent Application No. 17750162.4.
European Patent Office Communication and extended search report issued in the European Patent Application No. 17750163.2 dated Sep. 10, 2019.
Extended European Search Report dated Aug. 16, 2019 for Application No. 17750160.8.
Extended European Search Report dated Aug. 16, 2019 for Application No. 17750161.6.

* cited by examiner

INK JET RECORDING DEVICE

FIELD OF THE INVENTION

The present invention relates to an ink-jet printing apparatus and an ink-jet printing method using the ink-jet printing apparatus.

BACKGROUND OF THE INVENTION

In ink-jet printing methods, droplets of ink are directly projected onto a printing medium from very fine nozzles and allowed to adhere to the printing medium to form characters or images thereon. The ink-jet printing methods have now been extensively employed not only in printing applications for ordinary consumers but also recently in commercial and industrial printing applications because of various advantages such as easiness of full coloration, low cost, capability of using a plain paper as the printing medium, non-contact with printed characters or images, etc.

In the commercial and industrial printing applications, there has been proposed the high-speed printing method in which a rolled synthetic resin film is scanned using a stationary printing head of a line printing type.

Since the synthetic resin films are incapable of absorbing an ink therein, the ink printed on the films tends to still exhibit high flowability even after droplets of the ink are impacted onto the films, and tends to suffer from occurrence of intercolor bleeding and deterioration in quality of characters or images printed thereon. For this reason, in order to efficiently dry the ink printed on the films and prevent occurrence of intercolor bleeding, ink-jet printing methods using a drying means capable of heating a portion of the printing medium which is located just below an inkjet printing head have been proposed.

For example, JP 2013-166271A (Patent Literature 1) discloses an ink-jet printing method using a printing apparatus that includes a printing head provided with ink ejection nozzles and a heating means capable of heating a printing medium from a rear side surface of the printing medium opposed to a front side surface thereof on which the nozzles are disposed, said method including the step of drying an ink containing a solvent, a colorant and a resin using the heating means after the ink is impacted on the printing medium.

JP 2014-94495A (Patent Literature 2) discloses an ink-jet printing method including the steps of ejecting a white-based ink from nozzles to print white-based images on a soft packaging film, ejecting color inks from nozzles to allow the color inks to adhere to the white-based images and thereby print color images thereon, and heating the white-based images and color images at a temperature of higher than 40° C., in which the white-based ink contains a white-based coloring material and a urethane-based resin, but contains substantially no alkyl polyols having a boiling point of not lower than 280° C. In Patent Literatures 1 and 2, as is apparent from the figures shown therein, there are used the printing apparatuses that include the heating means capable of heating the printing medium from a rear side surface thereof, in which the heating means is disposed just below the ink-jet printing head.

SUMMARY OF THE INVENTION

The present invention relates to the following aspects [1] and [2].

[1] An ink-jet printing apparatus including:

an ink-jet printing head that ejects a water-based ink onto a resin printing medium that is transported in a feeding direction thereof; and an under heater that heats the printing medium from a rear side surface of the printing medium opposed to a front side surface thereof which faces to the ink-jet printing head, in which the under heater is disposed at a position spaced at a distance of not less than 0.05 mm and not more than 3.0 mm apart from the rear side surface of the printing medium upon printing.

[2] An ink-jet printing method including the step of ejecting a water-based ink onto a resin printing medium using a printing apparatus to print characters or images on the printing medium, said printing apparatus including an ink-jet printing head that ejects the water-based ink onto the resin printing medium that is transported in a feeding direction thereof; and an under heater that heats the printing medium from a rear side surface of the printing medium opposed to a front side surface thereof which faces to the ink-jet printing head, in which the under heater is disposed at a position spaced at a distance of not less than 0.05 mm and not more than 3.0 mm apart from the rear side surface of the printing medium upon printing.

DETAILED DESCRIPTION OF THE INVENTION

However, in the ink-jet printing apparatuses described in Patent Literatures 1 and 2, it is difficult to inhibit occurrence of color migration of the inks to a resin film to a sufficient extent, and furthermore the printing medium used in the soft packaging applications tends to suffer from formation of wrinkles, rumples and surface flaw upon transportation owing to a thin thickness of the printing medium. Therefore, it has been demanded to improve these conventional ink-jet printing apparatuses.

In order to suppress formation of wrinkles, rumples and surface flaw in the printing medium, it is preferred to use a non-contact type heating device. However, when using infrared irradiation or hot-air blowing, adverse influence on members other than the printing medium in the ink-jet printing apparatuses tends to become large, and it is not possible to sufficiently suppress occurrence of intercolor bleeding of the inks, and further there tend to occur problems such as clogging of ink-jet printing heads, etc.

The present invention relates to an ink-jet printing apparatus that is capable of obtaining printed materials that are free of occurrence of color migration and have good appearance even when printed on a resin printing medium using a water-based ink, and an ink-jet printing method using the ink-jet printing apparatus.

Meanwhile, the term "printing" as used herein is a concept that includes printing or typing for printing characters or images, and the term "printed material" as used herein is a concept that includes printed matters or typed materials on which characters or images are printed.

The present inventors have found that in an ink-jet printing apparatus using a resin printing medium, by using a platen (printing medium-pressing member)-integrated under heater and providing a slight gap between the printing medium and the under heater upon printing, it is possible to satisfy both of suppression of occurrence of color migration and good appearance of printed materials.

That is, the present invention relates to the following aspects [1] and [2].

[1] An ink-jet printing apparatus including:

an ink-jet printing head that ejects a water-based ink onto a resin printing medium that is transported in a feeding direction thereof; and an under heater that heats the printing medium from a rear side surface of the printing medium opposed to a front side surface thereof which faces to the ink-jet printing head, in which the under heater is disposed at a position spaced at a distance of not less than 0.05 mm and not more than 3.0 mm apart from the rear side surface of the printing medium upon printing.

[2] An ink-jet printing method including the step of ejecting a water-based ink onto a resin printing medium using a printing apparatus to print characters or images on the printing medium, said printing apparatus including an ink-jet printing head that ejects the water-based ink onto the resin printing medium that is transported in a feeding direction thereof; and an under heater that heats the printing medium from a rear side surface of the printing medium opposed to a front side surface thereof which faces to the ink-jet printing head, in which the under heater is disposed at a position spaced at a distance of not less than 0.05 mm and not more than 3.0 mm apart from the rear side surface of the printing medium upon printing.

According to the present invention, there are provided an ink-jet printing apparatus that is capable of obtaining printed materials that are free of occurrence of color migration and have good appearance even when printed on a resin printing medium using a water-based ink, and an ink-jet printing method using the ink-jet printing apparatus.

[Ink-Jet Printing Apparatus]

The inkjet printing apparatus of the present invention includes an ink-jet printing head that ejects a water-based ink onto a resin printing medium that is transported in a feeding direction thereof; and an under heater that heats the printing medium from a rear side surface of the printing medium opposed to a front side surface thereof which faces to the ink-jet printing head, in which the under heater is disposed at a position spaced at a distance of not less than 0.05 mm and not more than 3.0 mm apart from the rear side surface of the printing medium upon printing.

Conventionally, it is known that infrared irradiation is used as a drying means in ink-jet printing methods. However, upon drying by the infrared irradiation, since the difference between temperatures of respective colors of inks printed on the printing medium is increased owing to the difference between infrared absorption amounts thereof, it tends to be difficult to obtain printed materials that are free of occurrence of color migration and have good appearance. On the other hand, in the case of using those ink-jet printing apparatuses that are equipped with a hot-air blowing drying means, the film tends to suffer from meandering upon transportation thereof, so that it tends to be difficult to obtain printed materials having good appearance.

In addition, in the ink-jet printing apparatuses that are equipped with the platen-integrated type heating device (hereinafter also referred to merely as an "under heater"), if the printing medium is transported through the device while allowing a whole surface of the printing medium to come into contact with the heated platen, the printing medium tends to suffer from appearance defects such as formation of wrinkles, rumples and flaw on the surface of the printing medium. Therefore, there tends to occur such a problem that the ink-jet printing methods using such a platen-integrated type heating device are inadequate as a printing method that may be employed in the soft packaging applications using a thin film.

According to the ink-jet printing apparatus of the present invention, by providing a specific slight gap between the printing medium and the under heater, it is possible to obtain printed materials that are free of occurrence of intercolor bleeding owing to color migration of the inks and have good appearance without formation of wrinkles, rumples and surface flaw in the printing medium.

<Water-Based Ink>

The water-based ink used in the present invention (hereinafter also referred to merely as an "ink") contains at least a pigment (A) and water. Also, the water-based ink may further contain a polymer (B), an organic solvent (C), a surfactant (D) and other components, if required. Meanwhile, the term "water-based" as used in the present specification means that water has a largest content among components of a medium contained in the ink.

<Pigment (A)>

The pigment used in the present invention may be any kind of pigment, i.e., may be either an inorganic pigment or an organic pigment.

Specific examples of the inorganic pigment include carbon blacks, metal oxides and the like. The carbon blacks are preferably used as a pigment for black inks. The carbon blacks may include furnace blacks, thermal lamp blacks, acetylene blacks and channel blacks. As a pigment for white inks, there may be used metal oxides such as titanium oxide, zinc oxide, silica, alumina and magnesium oxide, etc. Among these pigments for white inks, preferred is titanium oxide.

Specific examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments. The organic pigments are preferably used for chromatic inks. The hue of the organic pigment used in the present invention is not particularly limited, and there may be used any chromatic pigment having a yellow color, a magenta color, a cyan color, a red color, a blue color, an orange color, a green color, etc.

The average particle size of the pigment particles in the black ink and chromatic ink is preferably not less than 60 nm and not more than 180 nm from the viewpoint of improving a tinting power and dispersion stability of the resulting ink. The average particle size of the pigment particles in the white ink is preferably not less than 150 nm and not more than 400 nm from the viewpoint of improving whiteness of the resulting white ink.

The pigment used in the present invention may be in the form of at least one pigment selected from the group consisting of a self-dispersible pigment, and particles formed by dispersing a pigment with the polymer (B).

[Self-Dispersible Pigment]

The self-dispersible pigment that may be used in the present invention means a pigment onto a surface of which at least one hydrophilic functional group (including an anionic hydrophilic group such as a carboxy group and a sulfonic group or a cationic hydrophilic group such as a quaternary ammonium group) is bonded either directly or through the other atom group such as an alkanediyl group having 1 to 12 carbon atoms to thereby render the pigment dispersible in an aqueous medium without using a surfactant or a resin. In order to form a pigment into a self-dispersible pigment, for example, a necessary amount of the hydrophilic functional group may be chemically bonded to the surface of the pigment by an ordinary method. Specific examples of commercially available products of the self-dispersible pigment include "CAB-O-JET 200", "CAB-O-JET 300", "CAB-O-JET 352K", "CAB-O-JET 250A", "CAB-O-JET 260M", "CAB-O-JET 270Y", "CAB-O-JET 450A", "CAB-O-JET 465M", "CAB-O-JET 470Y" and "CAB-O-JET 480V" available from Cabot Japan K.K.; "BONJET CW-1", "BONJET CW-2", etc., available from Orient Chemical Industries Co., Ltd.; "Aqua-Black 162", etc., available from Tokai Carbon Co., Ltd.; and "SENSIJET BLACK SDP-100", "SENSIJET BLACK SDP-1000", "SENSIJET BLACK SDP-2000", etc., available from SENSIENT INDUSTRIAL COLORS. The self-dispersible pigment is preferably used in the form of a pigment water dispersion prepared by dispersing the pigment in water.

[Particles Formed by Dispersing Pigment with Polymer (B)]

In the present invention, the pigment may be used in the form of particles formed by dispersing the pigment with the polymer (B). Examples of the configuration of the particles formed by dispersing the pigment with the polymer include 1) particles formed by kneading the pigment and the polymer and then dispersing the resulting kneaded material in a medium such as water; 2) particles formed by stirring the pigment and the polymer in a medium such as water to disperse the pigment in the medium such as water; 3) particles formed by mechanically dispersing the polymer raw material and the pigment to polymerize the polymer raw material and then dispersing the pigment in a medium such as water with the resulting polymer; and the like.

Furthermore, from the viewpoint of improving storage stability of the resulting ink, the polymer that is present in the particles formed by dispersing the pigment with the polymer may be crosslinked with a crosslinking agent. Examples of the crosslinking agent include compounds containing two or more functional groups that are capable of reacting with a functional group contained in the polymer. For example, in the case where the polymer contains a carboxy group, as the preferred crosslinking agent, there may be mentioned a polyglycidyl ether compound of a polyhydric alcohol.

[Polymer (B)]

In the present invention, from the viewpoint of improving dispersibility of the pigment as well as from the viewpoint of improving fusing properties of printed characters or images, the water-based ink preferably further contains the polymer (B). Examples of the polymer (B) used in the present invention include condensation-based resins such as polyurethanes and polyesters, and vinyl-based polymers such as acrylic resins, styrene-based resins, styrene-acrylic resins, butadiene-based resins, styrene-butadiene-based resins, vinyl chloride-based resins, vinyl acetate-based resins and acrylic-silicone-based resins. Among these polymers, preferred are vinyl-based polymers.

The weight-average molecular weight of the polymer (B) is preferably not less than 10,000, more preferably not less than 20,000, even more preferably not less than 30,000 and further even more preferably not less than 40,000, and is also preferably not more than 2,500,000 and more preferably not more than 1,000,000, from the viewpoint of improving dispersibility of the pigment as well as from the viewpoint of improving fusing properties of printed characters or images.

The polymer (B) used in the present invention may be used as a pigment dispersing polymer (B-1) for dispersing the pigment and a fusing aid polymer (B-2) for improving rub fastness of the resulting printed materials. These polymers (B-1) and (B-2) may be used in combination with each other.

[Pigment Dispersing Polymer (B-1)]

Examples of the pigment dispersing polymer (B-1) for dispersing the pigment used include condensation-based resins such as polyesters and polyurethanes, and vinyl-based polymers, etc. Among these polymers, from the viewpoint of improving dispersion stability of the pigment, preferred are vinyl-based polymers obtained by addition-polymerizing a vinyl monomer (such as vinyl compounds, vinylidene compounds and vinylene compounds). As the pigment dispersing polymer (B-1), there may be used either appropriately synthetized products or commercially available products.

The weight-average molecular weight of the pigment dispersing polymer (B-1) is preferably not less than 20,000, more preferably not less than 30,000 and even more preferably not less than 40,000, and is also preferably not more than 500,000, more preferably not more than 300,000 and even more preferably not more than 200,000, from the viewpoint of improving dispersibility of the pigment.

Examples of the vinyl-based polymers include polyacrylic acids such as "ARON AC-10SL" available from Toagosei Co., Ltd., and styrene-acrylic resins such as "JONCRYL 67", "JONCRYL 611", "JONCRYL 678", "JONCRYL 680", "JONCRYL 690" and "JONCRYL 819" all available from BASF Japan, Ltd., etc.

[Fusing Aid Polymer (B-2)]

The fusing aid polymer (B-2) is preferably used in the form of pigment-free polymer particles. Examples of components of the fusing aid polymer (B-2) include condensation-based resins such as polyurethanes and polyesters, and vinyl-based polymers such as acrylic resins, styrene-based resins, styrene-acrylic resins, butadiene-based resins, styrene-butadiene-based resins, vinyl chloride-based resins, vinyl acetate-based resins and acrylic-silicone-based resins. Among these polymers, from the viewpoint of promoting drying of the resulting ink on a printing substrate and improving rub fastness of the resulting printed materials, preferred are acrylic resins.

In addition, from the viewpoint of enhancing productivity of the water-based ink, the fusing aid polymer (B-2) is preferably used in the form of a dispersion containing polymer particles. As the fusing aid polymer (B-2), there may be used either appropriately synthetized products or commercially available products.

The fusing aid polymer (B-2) may be produced by copolymerizing a mixture of monomers by known polymerization methods. Examples of the preferred polymerization methods include an emulsion polymerization method and a suspension polymerization method. Among these polymerization methods, more preferred is the emulsion polymerization method.

Examples of commercially available products of the fusing aid polymer (B-2) include acrylic resins such as "Neocryl A1127" (anionic self-crosslinkable aqueous acrylic resin) available from DSM NeoResins, Inc., and "JONCRYL 390" available from BASF Japan, Ltd.; urethane resins such as "WBR-2018" and "WBR-2000U" both available from Taisei Fine Chemical Co., Ltd.; styrene-butadiene resins such as "SR-100" and "SR102" both available from Nippon A & L Inc.; styrene-acrylic resins such as "JONCRYL 7100", "JONCRYL 7600", "JONCRYL 537J", "JONCRYL PDX-7164", "JONCRYL 538J" and "JONCRYL 780" all available from BASF Japan, Ltd.; and vinyl chloride-based resins such as "VINYBLAN 700" and "VINYBLAN 701" both available from Nissin Chemical Industry Co., Ltd., etc.

The fusing aid polymer (B-2) may be used in the form of particles dispersed in water. The dispersion of the particles of the fusing aid polymer (B-2) serves for forming a film of the resulting ink on a printing substrate and improving fusing properties of the ink.

The weight-average molecular weight of the fusing aid polymer (B-2) used in the present invention is preferably not less than 10,000, more preferably not less than 20,000 and even more preferably not less than 50,000, and is also preferably not more than 2,500,000 and more preferably not more than 1,000,000, from the viewpoint of improving fusing properties of the resulting ink.

In addition, the average particle size of particles of the fusing aid polymer (B-2) in the dispersion containing the particles of the fusing aid polymer (B-2) or in the resulting ink is preferably not less than 10 nm, more preferably not less than 30 nm and even more preferably not less than 50 nm, and is also preferably not more than 300 nm, more preferably not more than 200 nm, even more preferably not more than 150 nm and further even more preferably not more than 130 nm, from the viewpoint of improving storage stability of the resulting ink.

<Organic Solvent (C)>

The organic solvent (C) preferably has a boiling point of not lower than 90° C. and lower than 250° C. from the viewpoint of suppressing occurrence of color migration of the resulting water-based ink and appearance defects of the printing medium as well as from the viewpoint of improving continuous ejection properties of the ink upon high-speed printing. The boiling point of the organic solvent (C) is preferably not lower than 130° C., more preferably not lower than 140° C. and even more preferably not lower than 150° C., and is also preferably not higher than 245° C., more preferably not higher than 240° C. and even more preferably not higher than 235° C., from the same viewpoints as described above.

Examples of the organic solvent (C) include a polyhydric alcohol (c-1) and a glycol ether (c-2), etc.

Examples of the aforementioned polyhydric alcohol (c-1) include 1,2-alkanediols such as ethylene glycol (boiling point (b.p.) 197° C.), propylene glycol (b.p. 188° C.), 1,2-butanediol (b.p. 193° C.), 1,2-pentanediol (b.p. 206° C.) and 1,2-hexanediol (b.p. 223° C.), diethylene glycol (b.p. 245° C.), polyethylene glycol, dipropylene glycol (b.p. 232° C.), 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.) and petriol (b.p. 216° C.).

Among these polyhydric alcohols, from the viewpoint of improving storage stability and continuous ejection properties of the resulting ink, preferred is at least one polyhydric alcohol selected from the group consisting of alkanediols having not less than 2 and not more than 6 carbon atoms, such as propylene glycol, diethylene glycol and 1,2-hexanediol, and polypropylene glycols having a molecular weight of 500 to 1000, and more preferred is at least one polyhydric alcohol selected from the group consisting of 1,2-alkanediols having not less than 3 and not more than 4 carbon atoms, such as propylene glycol and diethylene glycol, and the aforementioned polypropylene glycols.

(Glycol Ether (c-2))

Specific examples of the glycol ether (c-2) include alkylene glycol monoalkyl ethers and alkylene glycol dialkyl ethers. Among these compounds, from the viewpoint of improving continuous ejection properties of the resulting ink as well as from the viewpoint of obtaining good printed materials that are free of occurrence of color migration or appearance defects of the printing medium, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the alkylene glycol monoalkyl ethers include ethylene glycol ethyl ether (b.p. 136° C.), ethylene glycol isopropyl ether (b.p. 144° C.), ethylene glycol propyl ether (b.p. 151° C.), ethylene glycol butyl ether (b.p. 171° C.), diethylene glycol methyl ether (b.p. 194° C.), diethylene glycol ethyl ether (b.p. 202° C.), diethylene glycol isopropyl ether (b.p. 207° C.), diethylene glycol isobutyl ether (b.p. 230° C.), diethylene glycol butyl ether (b.p. 230° C.), triethylene glycol methyl ether (b.p. 248° C.), dipropylene glycol butyl ether (b.p. 231° C.), dipropylene glycol methyl ether (b.p. 189° C.) and tripropylene glycol methyl ether (b.p. 243° C.).

Of these alkylene glycol monoalkyl ethers, preferred is at least one compound selected from the group consisting of ethylene glycol isopropyl ether, ethylene glycol propyl ether, diethylene glycol methyl ether, diethylene glycol isopropyl ether, diethylene glycol isobutyl ether and diethylene glycol butyl ether, and more preferred is at least one compound selected from the group consisting of ethylene glycol isopropyl ether, diethylene glycol isopropyl ether and diethylene glycol isobutyl ether.

(Other Organic Solvents)

In the present invention, the water-based ink may also contains, in addition to the aforementioned organic solvent (C), those organic solvents that may be usually compounded in the water-based ink, such as the other alcohols, alkyl ethers of the alcohols, glycol ethers, nitrogen-containing heterocyclic compounds such as N-methyl-2-pyrrolidone, amides, amines and sulfur-containing compounds.

For example, 1,6-hexanediol (b.p. 250° C.), triethylene glycol (b.p. 285° C.), tripropylene glycol (b.p. 273° C.), polypropylene glycol (b.p. not lower than 250° C.) and glycerin (b.p. 290° C.), etc., may be used in combination with the aforementioned compound having a boiling point of lower than 250° C.

<Surfactant (D)>

The water-based ink used in the present invention preferably also contains a surfactant (D) from the viewpoint of suppressing increase in viscosity of the ink, improving continuous ejection properties of the ink and obtaining good printed materials that are free of occurrence of color migration or appearance defects of the printing medium. As the surfactant (D). there are preferably used those surfactants containing a silicone-based surfactant (d-1).

The silicone-based surfactant (d-1) is not particularly limited, and any suitable silicone-based surfactant may be appropriately selected and used as the silicone-based surfactant (d-1) according to the objects and applications of the water-based ink. Among these silicone-based surfactants, from the viewpoint of suppressing increase in viscosity of the resulting ink, improving continuous ejection properties of the ink and obtaining good printed materials that are free of occurrence of color migration or appearance defects of the printing medium, a polyether-modified silicone-based surfactant is preferably used.

(Polyether-Modified Silicone-Based Surfactant)

The polyether-modified silicone-based surfactant is capable of suppressing increase in viscosity of the resulting ink and occurrence of intercolor bleeding between the inks. Therefore, it is considered that the polyether-modified silicone-based surfactant contributes to production of good printed materials that are free of occurrence of color migration upon high-speed printing.

The polyether-modified silicone-based surfactant has such a structure that a hydrocarbon group bonded to a side chain and/or a terminal end of a silicone oil is substituted with a polyether group. Examples of the suitable polyether group of the polyether-modified silicone-based surfactant include a polyethyleneoxy group, a polypropyleneoxy group and a polyalkyleneoxy group formed by addition-bonding an ethyleneoxy group (EO) and a propyleneoxy group (a trimethyleneoxy group or a propane-1,2-diyloxy group; PO) to each other in a block form or a random form. More specifically, as the polyether-modified silicone-based surfactant, there may be used a compound formed by grafting a polyether group to a main chain of a silicone, a compound formed by bonding a silicone and a polyether group to each other in a block form, etc.

The HLB value of the polyether-modified silicone-based surfactant is preferably not less than 3.0, more preferably not less than 4.0 and even more preferably not less than 4.5 from the viewpoint of improving solubility of the polyether-modified silicone-based surfactant in the water-based ink. The term "HLB" as used herein means the value indicating an affinity of the surfactant to water and an oil, and can be calculated according to the following formula by Griffin method. Meanwhile, as the "hydrophilic group contained in surfactant" shown in the following formula, there may be mentioned, for example, a hydroxy group and an ethyleneoxy group.

$$HLB = 20 \times [(\text{molecular weight of hydrophilic group contained in surfactant})/(\text{molecular weight of surfactant})]$$

Specific examples of the polyether-modified silicone-based surfactant include "KF" series products available from Shin-Etsu Chemical Industry Co., Ltd., "SILFACE SAG" available from Nissin Chemical Industry Co., Ltd., and "BYK" series products available from BYK Chemie Japan K.K.

(Other Surfactants)

In the present invention, as the surfactant (D), the surfactants other than the polyether-modified silicone-based surfactant may be used in combination therewith. Among the surfactants other than the polyether-modified silicone-based surfactant, from the viewpoint of attaining good applicability to the ink, preferred is a nonionic surfactant.

Examples of the nonionic surfactant include (1) alkyl ethers, alkenyl ethers, alkynyl ethers or aryl ethers of polyoxyalkylenes which are produced by adding ethyleneoxide, propyleneoxide or butyleneoxide (hereinafter collectively referred to as an "alkyleneoxide") to a saturated or unsaturated, linear or branched higher alcohol having 8 to 22 carbon atoms, a polyhydric alcohol or an aromatic alcohol, (2) esters of a higher alcohol containing a saturated or unsaturated, linear or branched hydrocarbon group having 8 to 22 carbon atoms, and a polyvalent fatty acid, (3) polyoxyalkylene aliphatic amines containing a linear or branched alkyl group or alkenyl group having 8 to 20 carbon atoms, and (4) ester compounds of a higher fatty acid having 8 to 22 carbon atoms and a polyhydric alcohol, or compounds produced by adding an alkyleneoxide to the ester compounds.

Examples of commercially available products of the nonionic surfactant include "SURFYNOL" series products available from Nissin Chemical Industry Co., Ltd., and Air Products & Chemicals, Inc., "ACETYLENOL" series products available from Kawaken Fine Chemicals Co., Ltd., and "EMULGEN 120" (polyoxyethylene lauryl ether) available from Kao Corporation.

[Contents of Respective Components in Water-Based Ink and Properties of Water-Based Ink]

The contents of the respective components in the water-based ink used in the present invention as well as various properties of the water-based ink are as follows.

(Content of Pigment (A))

The content of the pigment (A) in the black or chromatic water-based ink is preferably not less than 2.0% by mass, more preferably not less than 4.0% by mass and even more preferably not less than 6.0% by mass from the viewpoint of enhancing optical density of the water-based ink printed. Also, the content of the pigment (A) in the black or chromatic water-based ink is preferably not more than 30.0% by mass, more preferably not more than 20% by mass, even more preferably not more than 15% by mass and further even more preferably not more than 10.0% by mass from the viewpoint of reducing viscosity of the water-based ink upon volatilization of the solvent therefrom as well as from the viewpoint of improving continuous ejection properties of the water-based ink and obtaining good printed materials that are free of occurrence of color migration or appearance defects of the printing medium.

The content of the pigment (A) in the white water-based ink is preferably not less than 4.0% by mass, more preferably not less than 6.0% by mass and even more preferably not less than 8.0% by mass, and is also preferably not more than 40% by mass, more preferably not more than 30% by mass, even more preferably not more than 20% by mass and further even more preferably not more than 15% by mass, from the viewpoint of completely covering the image 1 formed by the black or chromatic ink with the white ink to thereby eliminate color unevenness or mottling of the printed surface and prevent occurrence of thermal deformation of the resin printing medium.

(Content of Polymer (B))

The content of the polymer (B) in the water-based ink is preferably not less than 1.0% by mass, more preferably not less than 2.0% by mass and even more preferably not less than 3.0% by mass, and is also preferably not more than 20% by mass, more preferably not more than 13% by mass and even more preferably not more than 8.0% by mass, from the viewpoint of improving fusing properties of the water-based ink. The content of the polymer (B) as used herein means a total content of the pigment dispersing polymer (B-1) of the pigment-containing polymer particles and the fusing aid polymer (B-2).

In addition, in the case where the polymer (B) is used as the pigment dispersing polymer (B-1), the content of the pigment dispersing polymer (B-1) in the water-based ink is preferably not less than 0.01% by mass, more preferably not less than 0.05% by mass and even more preferably not less than 0.1% by mass, and is also preferably not more than 10% by mass, more preferably not more than 7.0% by mass and even more preferably not more than 5.0% by mass, from the viewpoint of improving fusing properties of the water-based ink.

Furthermore, in the case where the polymer (B) is used as the fusing aid polymer (B-2) in the ink, the content of the fusing aid polymer (B-2) in the water-based ink is preferably not less than 0.9% by mass, more preferably not less than 1.0% by mass and even more preferably not less than 1.2% by mass, and is also preferably not more than 10% by mass, more preferably not more than 6.0% by mass and even more preferably not more than 3.0% by mass, from the viewpoint of improving fusing properties of the water-based ink.

(Content of Organic Solvent (C))

The content of the organic solvent (C) in the water-based ink is preferably not less than 15% by mass, more preferably not less than 20% by mass and even more preferably not less than 25% by mass, and is also preferably not more than 45% by mass, more preferably not more than 40% by mass and even more preferably not more than 35% by mass, from the viewpoint of improving continuous ejection properties of the water-based ink.

The content of the polyhydric alcohol (c-1) in the water-based ink is preferably not less than 10% by mass, more preferably not less than 15% by mass and even more preferably not less than 20% by mass, and is also preferably not more than 45% by mass, more preferably not more than 40% by mass and even more preferably not more than 35% by mass, from the viewpoint of improving storage stability and continuous ejection properties of the water-based ink.

The content of the glycol ether (c-2) in the water-based ink is preferably not less than 1% by mass, more preferably not less than 2% by mass and even more preferably not less than 3% by mass, and is also preferably not more than 15% by mass, more preferably not more than 12% by mass and even more preferably not more than 8% by mass, from the viewpoint of improving storage stability and continuous ejection properties of the water-based ink.

The content of a high-boiling organic solvent having a boiling point of not lower than 250° C. in the water-based ink used in the present invention is preferably not more than 5% by mass, more preferably not more than 4% by mass and even more preferably not more than 3% by mass from the viewpoint of imparting adequate drying properties to the water-based ink and inhibiting occurrence of color migration, upon high-speed printing.

(Content of Surfactant (D))

The total content of the surfactant (D) in the water-based ink is preferably not less than 0.05% by mass, more preferably not less than 0.1% by mass and even more preferably not less than 0.2% by mass, and is also preferably not more than 3.0% by mass, more preferably not more than 2.0% by mass and even more preferably not more than 1.0% by mass, from the viewpoint of suppressing increase in viscosity of the water-based ink and improving continuous ejection properties of the water-based ink as well as from the viewpoint of obtaining good printed materials that are free of occurrence of color migration or appearance defects of the printing medium.

(Content of Water)

The content of water in the water-based ink is preferably not less than 35% by mass, more preferably not less than 40% by mass and even more preferably not less than 45% by mass, and is also preferably not more than 75% by mass, more preferably not more than 70% by mass and even more preferably not more than 65% by mass, from the viewpoint of improving continuous ejection properties and storage stability of the water-based ink as well as from the viewpoint of obtaining good printed materials that are free of occurrence of color migration or appearance defects of the printing medium.

(Other Components)

The water-based ink used in the present invention may also contain, in addition to the aforementioned components, various ordinary additives such as a humectant, a wetting agent, a penetrant, a defoaming agent, an antiseptic agent, a mildew-proof agent and a rust preventive.

(Properties of Water-Based Ink)

In the case where the water-based ink is in the form of a black ink or a chromatic ink, the average particle size of the particles contained in the black or chromatic water-based ink is preferably not less than 40 nm, more preferably not less than 60 nm and even more preferably not less than 80 nm, and is also preferably not more than 250 nm, more preferably not more than 220 nm, even more preferably not more than 200 nm and further even more preferably not more than 180 nm, from the viewpoint of improving storage stability and ejection properties of the water-based ink.

In the case where the water-based ink is in the form of a white ink, the average particle size of the particles contained in the white water-based ink is preferably not less than 100 nm, more preferably not less than 150 nm and even more preferably not less than 200 nm, and is also preferably not more than 400 nm, more preferably not more than 350 nm, even more preferably not more than 300 nm and further even more preferably not more than 280 nm, from the viewpoint of covering the image 1 formed by the black ink and/or the chromatic ink with the white ink.

From the viewpoint of improving ejection durability of the water-based ink, the static surface tension of the water-based ink as measured at 20° C. is preferably not less than 22 mN/m, more preferably not less than 24 mN/m and even more preferably not less than 25 mN/m, and is also preferably not more than 45 mN/m, more preferably not more than 40 mN/m and even more preferably not more than 35 mN/m.

The viscosity of the water-based ink as measured at 32° C. is preferably not less than 2.0 mPa·s, more preferably not less than 3.0 mPa·s and even more preferably not less than 4.0 mPa·s, and is also preferably not more than 12 mPa·s, more preferably not more than 9.0 mPa·s and even more preferably not more than 7.0 mPa·s, from the viewpoint of improving continuous ejection properties of the water-based ink.

The pH value of the water-based ink is preferably not less than 7.0, more preferably not less than 8.0, even more preferably not less than 8.5 and further even more preferably not less than 8.7 from the viewpoint of improving storage stability and continuous ejection properties of the water-based ink as well as from the viewpoint of obtaining good printed materials that are free of occurrence of color migration or appearance defects of the printing medium, and is also preferably not more than 11.0 and more preferably not more than 10.0 from the viewpoint of improving resistance of members to the water-based ink and suppressing skin irritation.

Meanwhile, the average particle size, static surface tension, viscosity and pH value of the water-based ink may be measured by the methods described in Examples below.

<Ink-Jet Printing Apparatus and Ink-Jet Printing Method>

The ink-jet printing apparatus of the present invention includes an ink-jet printing head that ejects a water-based ink onto a resin printing medium that is transported in a feeding direction thereof; and an under heater that heats the printing medium from a rear side surface of the printing medium opposed to a front side surface thereof which faces to the ink-jet printing head, in which the under heater is disposed at a position spaced at a distance of not less than 0.05 mm and not more than 3.0 mm apart from the rear side surface of the printing medium upon printing.

In addition, the ink-jet printing method of the present invention is such an ink-jet printing method including the step of ejecting a water-based ink onto a resin printing medium using a printing apparatus to print characters or images on the printing medium, said printing apparatus including an ink-jet printing head that ejects the water-based ink onto the resin printing medium that is transported in a feeding direction thereof; and an under heater that heats the printing medium from a rear side surface of the printing medium opposed to a front side surface thereof which faces to the ink-jet printing head, in which the under heater is disposed at a position spaced at a distance of not less than 0.05 mm and not more than 3.0 mm apart from the rear side surface of the printing medium upon printing.

[Resin Printing Medium]

The resin printing medium used in the present invention may be in the form of either a sheet of paper or a rolled paper. However, from the viewpoint of enhancing productivity of printed materials, among them, preferred is a rolled printing medium.

As the resin printing medium, there may be mentioned a transparent synthetic resin film. Examples of the transparent synthetic resin film as the resin printing medium include a polyester film, a polyvinyl chloride film, a polypropylene film, a polyethylene film, a nylon film, etc. These films may be in the form of any of a biaxially stretched film, a monoaxially stretched film and a non-stretched film. Among these films, preferred are a polyester film and a stretched polypropylene film, and more preferred are a polyester film such as a polyethylene terephthalate film subjected to a surface treatment such as a corona discharge treatment, and a biaxially stretched polypropylene film.

The thickness of the resin printing medium is not particularly limited, and the resin printing medium may be in the form of a thin film having a thickness of from 1 μm to less than 20 μm. However, from the viewpoint of suppressing occurrence of appearance defects of the printing medium as well as from the viewpoint of improving availability of the resin printing medium, the thickness of the resin printing medium is preferably not less than 20 μm, more preferably not less than 30 μm and even more preferably not less than 35 μm, and is also preferably not more than 100 μm, more preferably not more than 80 μm and even more preferably not more than 75 μm.

Examples of commercially available products of the transparent synthetic resin film include "LUMIRROR T60" (polyethylene terephthalate) available from Toray Industries, Inc., "TAIKO FE2001" (corona-treated polyethylene terephthalate) available from Futamura Chemical Co, Ltd., "PVC80B P" (polyvinyl chloride) available from Lintec Corporation, "KINATH KEE 70CA" (polyethylene) available from Lintec Corporation, "YUPO SG90 PAT1" (polypropylene) available from Lintec Corporation and "BONYL RX" (nylon) available from Kohjin Film & Chemicals Co., Ltd., etc.

[Ink-Jet Printing Head]

The ink-jet printing apparatus used in the present invention preferably includes a plurality of ink-jet printing heads that are capable of ejecting a plurality of water-based inks.

As the ink-jet printing heads, there may be used any types of printing heads including a serial-type printing head and a line-type printing head, but the line-type printing head is preferably used in the present invention. The line-type printing head is a printing head of an elongated shape having a length near a width of the printing medium. In the ink-jet printing apparatus using the line-type printing head, while keeping the printing head in a stationery state and moving the printing medium along a transporting direction thereof, droplets of the ink are ejected from openings of nozzles of the printing head in association with the movement of the printing medium, whereby it is possible to allow the ink droplets to adhere onto the printing medium to print characters or images, etc., thereon.

The ink droplets are preferably ejected by a piezoelectric method. In the piezoelectric method, the ink droplets are ejected from a number of nozzles communicated with respective pressure chambers by vibrating a wall surface of the respective pressure chambers by means of a piezoelectric element. Meanwhile, in the present invention, there may also be used a thermal method for ejecting the ink droplets.

The voltage applied to the printing head is preferably not less than 5 V, more preferably not less than 10 V and even more preferably not less than 15 V, and is also preferably not more than 40 V, more preferably not more than 35 V and even more preferably not more than 30 V, from the viewpoint of conducting the high-speed printing with a high efficiency, etc.

The drive frequency of the printing head is preferably not less than 2 kHz, more preferably not less than 5 kHz and even more preferably not less than 8 kHz, and is also preferably not more than 80 kHz, more preferably not more than 70 kHz and even more preferably not more than 60 kHz, from the viewpoint of conducting the high-speed printing with a high efficiency, etc.

[Printing Method]

The amount of the ink droplets ejected is preferably not less than 0.5 pL, more preferably not less than 1.0 pL, even more preferably not less than 1.5 pL, and further even more preferably not less than 1.8 pL, and is also preferably not more than 20 pL, more preferably not more than 15 pL and even more preferably not more than 13 pL, as calculated per one ink droplet ejected, from the viewpoint of maintaining accuracy of impact positions of the ink droplets and improving quality of printed characters or images.

The printing head resolution is preferably not less than 400 dpi (dot/inch), more preferably not less than 500 dpi and even more preferably not less than 550 dpi.

From the viewpoint of reducing viscosity of the resulting ink and improving continuous ejection properties of the ink, the inside temperature of the printing head, preferably a line-type printing head, upon the printing, is preferably controlled to not lower than 20° C., more preferably not lower than 25° C. and even more preferably not lower than 30° C., and is also preferably controlled to not higher than 45° C., more preferably not higher than 40° C. and even more preferably not higher than 38° C.

The temperature of the surface of the printing medium opposed to an ink-ejection region of the printing head, preferably a line-type printing head, is preferably controlled to not lower than 35° C., more preferably not lower than 40° C. and even more preferably not lower than 45° C., and is also preferably controlled to not higher than 75° C., more preferably not higher than 65° C., even more preferably not higher than 60° C. and further even more preferably not higher than 55° C.

The transportation speed of the printing medium is preferably not less than 10 m/min, more preferably not less than 20 m/min and even more preferably not less than 30 m/min from the viewpoint of enhancing productivity of printed materials. The transportation speed of the printing medium means a velocity of movement of the printing medium in the direction along which the printing medium is moved upon the printing.

[Water-Based Ink]

The water-based ink used in the present invention is preferably constituted of two or more kinds of water-based inks selected from the group consisting of a black ink, a chromatic ink and a white ink.

The temperature of the surface of the printing medium onto which the water-based ink is ejected is preferably not lower than 35° C., more preferably not lower than 40° C. and even more preferably not lower than 45° C., and is also preferably not higher than 75° C., more preferably not higher than 70° C. and even more preferably not higher than 60° C.

The amount of the water-based ink deposited on the printing medium is preferably not less than 0.1 g/m$^2$, and is also preferably not more than 25 g/m$^2$ and more preferably not more than 20 g/m$^2$, in terms of a solid content thereof, from the viewpoint of improving image quality of the resulting printed materials and increasing the printing speed.

[Other Means]

The ink-jet printing apparatus of the present invention may also include fusing/curing means for the following purpose. That is, after ejecting the water-based ink, i.e., a black ink and/or a chromatic ink, onto the printing medium to print characters or images thereon, the black ink and/or the chromatic ink thus ejected are fused on the printing medium so as to prevent droplets of the respective inks from suffering from intercolor bleeding therebetween even when the inks are successively ejected from the next printing heads.

The term "fusing" as used herein means a concept including both penetration of the inks impacted onto the printing medium into fibers of a paper thereof and drying of the inks from the surface of the printing medium, and also indicates such a condition that the ink impacted on the surface of the printing medium is no longer present in the form of droplets thereon. In addition, the term "curing" as used herein means such a condition that the ink droplets impacted onto the printing medium are solidified so that the ink is fixed onto the surface of the printing medium.

Examples of the fusing/curing means include an apparatus capable of applying a thermal energy to the inks on the printing medium, such as a heater, a hot-air fan, etc.

Meanwhile, the white ink may be subsequently ejected onto the image 1 formed by at least one ink selected from the group consisting of the black ink and the chromatic ink to cover and hide the image1 therewith, so that the image 1 can be printed as such an image formed on a background of the white ink.

In addition, in the present invention, a drying mechanism may also be disposed on a downstream side in the feeding direction of the printing medium to dry the printing medium having characters or images printed thereon. Examples of the drying mechanism include an apparatus capable of applying a thermal energy to the inks on the printing medium, such as a heater, a hot-air fan, etc.

<Ink-Jet Printing Apparatus>

Figure 1:
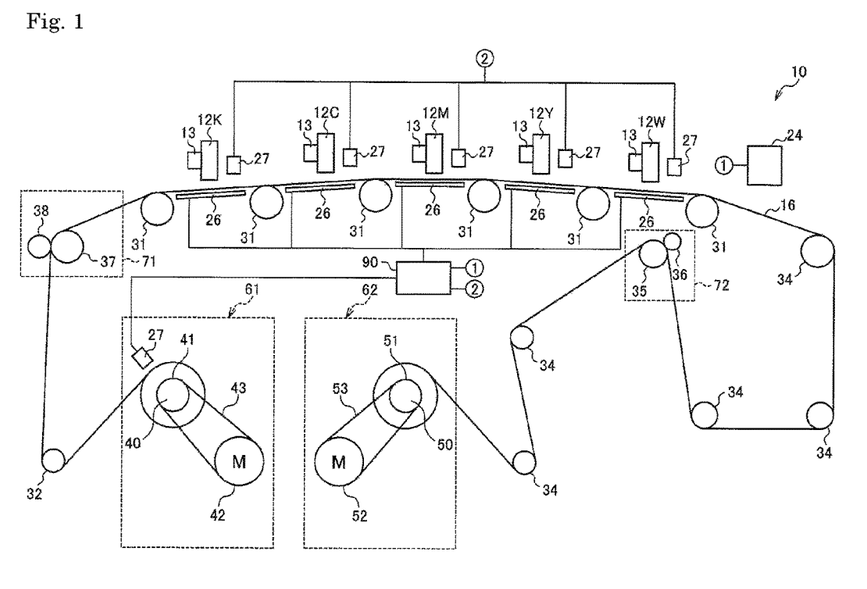
FIG. 1 is a schematic structural view showing an embodiment of an inkjet printing apparatus used in the present invention.
Figure 2:
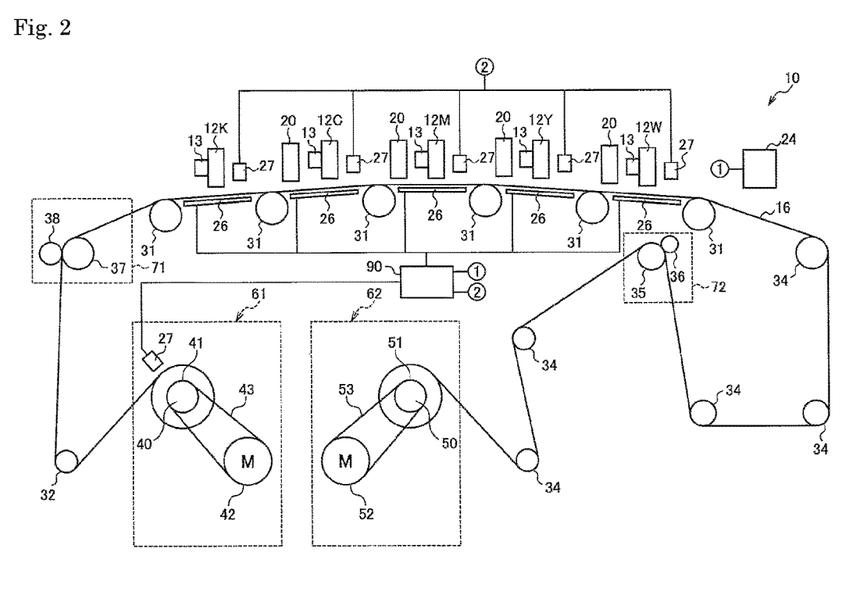
FIG. 2 is a schematic structural view showing another embodiment of the ink-jet printing apparatus shown in FIG. 1 which further includes fusing/curing means.

Next, the ink-jet printing apparatus of the present invention is explained by referring to FIGS. 1 and 2.

FIG. 1 is a schematic structural view showing an embodiment of an ink-jet printing apparatus used in the present invention. In FIG. 1, there is shown an inkjet printing apparatus 10 which is an apparatus for printing characters or images on a printing medium 16 formed of a resin film using a water-based ink that is constituted of a black ink (K), a cyan ink (C), a magenta ink (M), a yellow ink (Y) and a white ink (W).

The ink-jet printing apparatus 10 includes a web roll heating/supporting mechanism 61, a plurality of turning rollers 32, a feeding side tension mechanism 71, a plurality of ink-jet printing heads 12K, 12C, 12M and 12Y, a plurality of head-distance adjusting mechanisms 13, a plurality of under heaters 26, a plurality of temperature measuring devices 27, a plurality of support rollers 31, a take-up side tension mechanism 72, an afterheater 24, a heating amount control device 90, a plurality of turning rollers 34 and a take-up mechanism 62.

The web roll of the printing medium 16 is formed of a rolled synthetic resin film.

The printing medium 16 is wound off from the web roll heating/supporting mechanism 61 and then fed to the feeding side tension mechanism 71 via the plurality of turning rollers 32.

The printing medium 16 fed from the feeding side tension mechanism 71 is successively transported between the ink-jet printing heads 12K, 12C, 12M, 12Y and 12W, the plurality of under heaters 26 and the plurality of fusing/curing means 20 while being supported by the support rollers 31, and dried by the afterheater 24 to thereby obtain a printed material.

The printing medium 16 thus printed is transported via the plurality of turning rolls 34 and the take-up side tension mechanism 72, and wound up into a roll shape in the take-up mechanism 62.

The web roll heating/supporting mechanism 61 includes a support roll 40 for supporting the web roll formed by winding the printing medium 16 into a roll shape, a pulley 41 mounted to the support roll 40, an endless belt 43 fitted over the pulley 41, and a feed motor 42 for applying a rotational force to the endless belt 43. The web roll heating/supporting mechanism 61 may also include a roll equipped with a heater as the support roll 40, or a heating device for heating the support roll 40 which is accommodated therein, so as to heat the web roll. Thus, the web roll heating/supporting mechanism 61 is constructed such that the support roll 40 is rotated by operating the feed motor 42, and the printing medium 16 wound off from the web roll is fed therefrom.

The feeding side tension mechanism 71 and the take-up side tension mechanism 72 are associated with each other as described hereinlater so as to apply a tension force to the printing medium 16.

The feeding side tension mechanism 71 serves for controlling a transportation speed of the printing medium 16 in the feeding direction thereof by sandwiching the printing medium 16 between a pair of rollers 37 and 38 and controlling a rotating speed of the roller 37.

The take-up side tension mechanism 72 serves for controlling a transportation speed of the printing medium 16 in the feeding direction thereof by sandwiching the printing medium 16 between a pair of rollers 35 and 36 and controlling a rotating speed of the roller 35. In addition, the roller 35 applies such a force as to push the printing medium 16 upwards, so that a predetermined tension force is exerted to a portion of the printing medium 16 located between the feeding side tension mechanism 71 and the take-up side tension mechanism 72.

The ink-jet printing heads 12K, 12C, 12M, 12Y and 12W are such printing heads that are operated for ejecting predetermined amounts of the black ink (K), the cyan ink (C), the magenta ink (M), the yellow ink (Y) and the white ink (W), respectively, onto a front surface side of the printing medium 16, to thereby print characters or images thereon. The inkjet printing heads are each preferably in the form of a line-type printing head in which a plurality of printing nozzles are arranged in line. Upon the printing, the color inks are ejected from the respective printing heads while transporting the printing medium 16, so that colored characters or images can be formed on the printing medium 16.

Meanwhile, in FIG. 1, there is illustrated the ink-jet printing apparatus in which the five color inks, i.e., the black ink, the three chromatic inks including the cyan ink (C), the magenta ink (M) and the yellow ink (Y), and the white ink are used. However, six or more color inks may also be used in the ink-jet printing apparatus.

FIG. 2 is a schematic structural view showing another embodiment of the ink-jet printing apparatus shown in FIG. 1 which further includes fusing/curing means.

In FIG. 2, the fusing/curing means 20 are respectively disposed on a downstream side of the ink-jet printing heads 12K, 12C, 12M and 12Y, more specifically between adjacent two of the plurality of ink-jet printing heads 12K, 12C, 12M, 12Y and 12W to fuse and cure the black ink (K), the cyan ink (C), the magenta ink (M) and the yellow ink (Y), respectively, which have been ejected onto the printing surface of the printing medium 16. Examples of the fusing/curing means 20 include an apparatus capable of applying a thermal energy to the inks on the printing medium, such as a heater, a hot-air fan, etc.

The plurality of head-distance adjusting mechanisms 13 serve as a mechanism for controlling head distances of the respective ink-jet printing heads 12K, 12C, 12M, 12Y and 12W in the case where the distances between the respective ink-jet printing heads 12K, 12C, 12M, 12Y and 12W and the printing medium 16 are defined as a plurality of head distances. The head-distance adjusting mechanisms 13 serve for controlling the head distances, for example, in view of the heating amounts controlled by the heating amount control device 90.

The plurality of under heaters 26 are respectively disposed on the rear side surface of the printing medium 16 which is opposed to the front side surface thereof which faces to the plurality of ink-jet printing heads 12K, 12C, 12M, 12Y and 12W, to heat the printing medium 16. The under heaters 26 may be, for example, in the form of a heater of a hot water type or a heater of a thermoelectric type having a stainless steel or ceramic plate. The temperature of the respective under heaters 26 upon printing is preferably not lower than 35° C., more preferably not lower than 40° C. and even more preferably not lower than 45° C. from the viewpoint of obtaining good printed materials that are free of occurrence of color migration and formation of wrinkles, rumples and surface flaw in the printing medium, and is also preferably not higher than 75° C., more preferably not higher than 70° C. and even more preferably not higher than 65° C. from the viewpoint of suppressing occurrence of appearance defects in the resulting printed materials and saving energy consumed upon production of the printed materials.

The plurality of temperature measuring devices 27 serve for performing non-contact measurement of surface temperatures of the printing medium at a plurality of measuring positions thereof in the case where the plurality of measuring positions of the printing medium are defined so as to include a position of the printing medium 16 at which the printing medium is wound into the web roll in the web roll heating/supporting mechanism 61 and positions of the printing medium 16 which are respectively located just below the plurality of ink-jet printing heads 12K, 12C, 12M, 12Y and 12W.

The plurality of support rollers 31 each serve as a roll for supporting the printing medium 16 so as to prevent the printing medium 16 transported in the feeding direction thereof from hanging down. In the feeding direction of the printing medium, each of the under heaters 26 is disposed between the adjacent two support rollers 31. Since the printing medium 16 is supported by the plurality of support rollers 31, the respective distances between the printing medium 16 thus tensioned, and the plurality of under heaters 26 and the ink-jet printing heads 12K, 12C, 12M, 12Y and 12W can be maintained with high accuracy.

The afterheater 24 is constructed of a heat irradiation-type infrared heater for heating and drying the printing medium 16.

The heating amount control device 90 serves for controlling a heating amount of the web roll heating/supporting mechanism, heating amounts of the plurality of under heaters 26 and a heating amount of the afterheater 24, on the basis of the temperatures measured by the temperature measuring devices 27, such that the tensioned printing medium 16 is maintained at a constant temperature.

The take-up mechanism 62 includes the take-up roll 50 for winding up the printing medium 16 therearound, a pulley 51 mounted to the take-up roll, an endless belt 53 fitted over the pulley 51 and a take-up motor 52 for applying a rotational force to the endless belt 53. Thus, the take-up mechanism 62 is constructed such that the take-up motor 52 operates to rotate the tale-up roll 50 whereby the printing medium 16 printed is wound up therearound.

Figure 3:
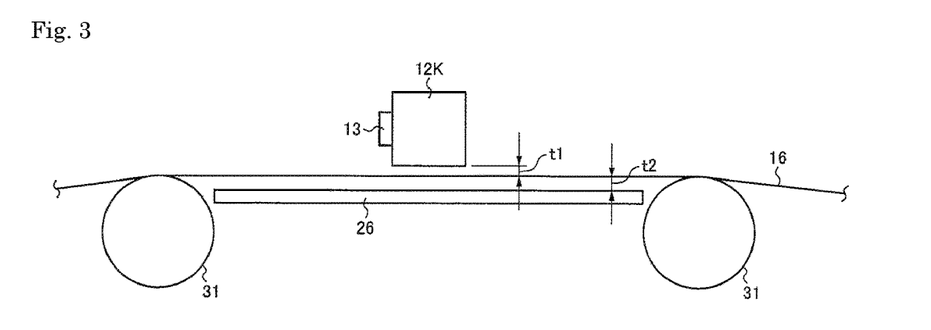
FIG. 3 is an explanatory view showing details of an embodiment of an under heater portion of the ink-jet printing apparatus used in the present invention.

Next, the ink-jet printing apparatus 10 is explained in more detail by referring to FIG. 3.

Although only the ink-jet printing head 12K is illustrated in FIG. 3, it should be noted that the same explanation as given herein will also be applied to the other ink-jet printing heads.

The under heater 26 is disposed at a position spaced at a predetermined distance t2 apart from the rear side surface of the printing medium 16 upon printing. The predetermined distance t2 is a distance at which the gap between the printing medium 16 and the under heater 26 becomes minimum, and may be measured, for example, using calipers.

The distance t2 is preferably not less than 0.05 mm, more preferably not less than 0.1 mm and even more preferably not less than 0.2 mm, and is also preferably not more than 3.0 mm, more preferably not more than 2.0 mm, even more preferably not more than 1.5 mm, further even more preferably not more than 1.2 mm and still further even more preferably not more than 0.8 mm, from the viewpoint of efficiently drying the printing medium printed while preventing occurrence of color migration and appearance defects in the resulting printed materials.

In addition, the under heater 26 is disposed between the support roll 31 located on an upstream side of the feeding direction and the support roll 31 located on a downstream side of the feeding direction. In other words, upon the printing, the under heater 26 is disposed at a position spaced apart from a tangential plane to both of an outer cylindrical side surface of the support roll 31 located on the upstream side of the feeding direction and an outer cylindrical side surface of the support roll 31 located on the downstream side of the feeding direction. In the region between the support roll 31 located on the upstream side and the support roll 31 located on the downstream side, the printing medium 16 is inhibited from coming into contact with those members other than the support rolls 31.

From the viewpoint of forming a suitable gap between the printing medium 16 and the under heater 26 and avoiding contact of the printing medium 16 with those members other than the support rolls 31, it is preferred that a tension force is applied to a portion of the printing medium between the support roll 31 located on the upstream side of the feeding direction and the support roll 31 located on the downstream side of the feeding direction. The tension force applied to the printing medium is preferably not less than 20 N and more preferably not less than 30 N from the viewpoint of forming a suitable gap between the printing medium 16 and the under heater 26, and is also preferably not more than 60 N and more preferably not more than 50 N from the viewpoint of preventing the printing medium 16 from suffering from elongation and breaking.

Also, upon the printing, the distance t1 between the ink-jet printing head 12K and the printing medium 16 is preferably not less than 0.1 mm, more preferably not less than 0.2 mm and even more preferably not less than 0.4 mm, and is also preferably not more than 5.0 mm, more preferably not more than 4.0 mm and even more preferably not more than 3.0 mm, from the viewpoint of improving accuracy of impact positions of the ink droplets and transportation stability of the film substrate.

EXAMPLES

In the following Production Examples, Examples and Comparative Examples, the "part(s)" and "%" indicate "part(s) by mass" and "% by mass", respectively, unless otherwise specified.

(1) Measurement of Weight-Average Molecular Weight of Polymer

The weight-average molecular weight of the polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min)] using a solution prepared by dissolving phosphoric acid and lithium bromide in N,N-dimethyl formamide such that the concentrations of phosphoric acid and lithium bromide in the solution were 60 mmol/L and 50 mmol/L, respectively, as an eluent, and using a monodisperse polystyrene having a known molecular weight as a reference standard substance.

(2) Measurement of Average Particle Sizes of Pigment-Containing Polymer Particles and Fusing Aid Polymer Particles The particles were subjected to cumulant analysis using a laser particle analyzing system "ELS-8000" available from Otsuka Electrics Co., Ltd., to measure an average particle size thereof. The above measurement was conducted under the conditions including a temperature of 25° C., an angle between incident light and detector of 90° and a cumulative number of 100 times, and a refractive index of water (1.333) was input to the analyzing system as a refractive index of the dispersing medium. The measurement was conducted by adjusting a concentration of the dispersion to be measured to $5 \times 10^{-3}\%$ by mass in terms of a solid content thereof.

(3) Measurement of Solid Content of Water Dispersion

Sodium sulfate dried to constant weight in a desiccator was weighed in an amount of 10.0 g and charged into a 30 mL polypropylene reaction vessel (φ: 40 mm; height: 30 mm), and about 1.0 g of a sample to be measured was added to the reaction vessel. The contents of the reaction vessel were mixed with each other and then accurately weighed. The resulting mixture was maintained in the reaction vessel at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(4) Measurement of Viscosity of Water-Based Ink

The viscosity of the water-based ink was measured at 32° C. using an E-type viscometer "TV-25" (equipped with a standard cone rotor (1° 34'×R24); rotating speed: 50 rpm) available from Toki Sangyo Co., Ltd.

(5) Measurement of Static Surface Tension of Water-Based Ink

A platinum plate was dipped in 5 g of the water-based ink filled in a cylindrical polyethylene vessel (3.6 cm in diameter×1.2 cm in depth), and the static surface tension of the water-based ink was measured at 20° C. using a surface tension meter "CBVP-Z" (tradename) available from Kyowa Interface Science Co., Ltd.

(6) Measurement of pH of Water-Based Ink

The pH value of the water-based ink was measured at 25° C. using a bench-top pH meter "F-71" available from Horiba Ltd., equipped with a pH electrode "6337-10D" available from Horiba Ltd.

Production Example 1 (Synthesis of Pigment Dispersing Polymer)

Sixteen (16) parts of methacrylic acid available from Wako Pure Chemical Industries, Ltd., 44 parts of styrene available from Wako Pure Chemical Industries, Ltd., 30 parts of a styrene macromonomer "AS-6S" (number-average molecular weight: 6,000; solid content: 50%) available from Toagosei Co., Ltd., and 25 parts of methoxypolyethylene glycol methacrylate "BLEMMER PME-200" available from NOF Corporation were mixed with each other to prepare 115 parts of a monomer mixture solution.

Eighteen (18) parts of methyl ethyl ketone and 0.03 part of 2-mercaptoethanol as a chain transfer agent as well as 10% (11.5 parts) of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% (103.5 parts) of the monomer mixture solution, 0.27 part of the aforementioned chain transfer agent, 42 parts of methyl ethyl ketone and 3 parts of 2,2'-azobis(2,4-dimethylvaleronitrile) "V-65" as a polymerization initiator available from Wako Pure Chemical Industries, Ltd., was charged into a dropping funnel. In a nitrogen atmosphere, the mixed solution in the reaction vessel was heated to 75° C. while stirring, and then the mixed solution in the dropping funnel was added dropwise thereinto over 3 hours. After the elapse of 2 hours from completion of the dropwise addition while maintaining the resulting mixed solution at a temperature of 75° C., a solution prepared by dissolving 3 parts of the aforementioned polymerization initiator in 5 parts of methyl ethyl ketone was added to the mixed solution, and the resulting reaction solution was further aged at 75° C. for 2 hours and at 80° C. for 2 hours, followed by further adding 50 parts of methyl ethyl ketone thereto, thereby obtaining a solution of a pigment dispersing polymer (having a weight-average molecular weight of 50,000). The solid content of the thus obtained pigment dispersing polymer solution was 45% by mass.

Production Example 2 (Production of Water Dispersion of Black Pigment-Containing Polymer Particles)

Added into a solution prepared by dissolving 95.2 parts of the pigment dispersing polymer solution obtained in Production Example 1 in 53.9 parts of methyl ethyl ketone were 15.0 parts of a 5N sodium hydroxide aqueous solution and 0.5 part of a 25% ammonia aqueous solution both acting as a neutralizing agent as well as 341.3 parts of ion-exchanged water. Then, 100 parts of C.I. Pigment Black 7 (P.B. 7) as a carbon black pigment available from Cabot Japan K.K., was further added to the resulting mixture to prepare a pigment mixed solution. The degree of neutralization of the thus prepared pigment mixed solution was 78.8 mol %. The pigment mixed solution was mixed at 20° C. for 1 hour using a disper blade operated at 7000 rpm. The resulting dispersion was dispersed under a pressure of 180 MPa using a Microfluidizer "High-Pressure Homogenizer M-140K" available from Microfluidics Corporation by passing the dispersion through the device 15 times.

The thus obtained dispersion of the black pigment-containing polymer particles was held at 60° C. under reduced pressure to remove methyl ethyl ketone therefrom, followed by further removing a part of water therefrom. The resulting dispersion was subjected to centrifugal separation, and a liquid layer portion separated therefrom was filtered through a filter "Minisart Syringe Filter" (pore diameter: 5 μm; material: cellulose acetate) available from Sartorius Inc., to remove coarse particles therefrom, thereby obtaining a water dispersion of the black pigment-containing polymer particles. The solid content of the thus obtained water dispersion was 25% by mass.

Then, 0.45 part of an epoxy crosslinking agent "DENACOL EX 321L" (tradename; trimethylolpropane polyglycidyl ether; epoxy equivalent: 130) available from Nagase ChemteX Corporation and 15.23 parts of ion-exchanged water were added to 100 parts of the resulting water dispersion of the black pigment-containing polymer particles, and the resulting mixture was subjected to heat treatment at 70° C. for 3 hours while stirring. After cooling the mixture to room temperature, a liquid layer portion separated therefrom was filtered through a filter "Minisart Syringe Filter" (pore diameter: 5 μm; material: cellulose acetate) available from Sartorius Inc., to remove coarse particles therefrom, thereby obtaining a water dispersion of the black pigment-containing polymer particles (solid content: 22% by mass). The average particle size of the black pigment-containing polymer particles in the resulting water dispersion was 100 nm. The results are shown in Table 1.

Production Examples 3 to 5 (Production of Water Dispersions of Cyan Pigment-, Magenta Pigment- and Yellow Pigment-Containing Polymer Particles)

The same procedure as in Production Example 2 was repeated except that the black pigment was replaced with a cyan pigment "P.B. 15:3" available from DIC Corporation, a magenta pigment "P.R. 150" available from Fuji Pigment Co., Ltd., and a yellow pigment "P.Y. 74" available from Dainichiseika Color & Chemicals Mfg. Co., Ltd., respectively, and the production conditions used therein were changed as shown in Table 1, thereby obtaining water dispersions of pigment-containing polymer particles (solid content: 22% by mass). The results are shown in Table 1.

Production Example 6 (Production of Water Dispersion of White Pigment-Containing Polymer Particles)

A 5 L plastic reaction vessel was charged with 2500 g of a polyacrylic acid dispersant "ARON AC-10SL" (solid content: 40%) available from Toagosei Co., Ltd., and 3.57 g of ion-exchanged water, and then while cooling the thus filled reaction vessel in an ice bath and stirring the resulting solution therein at 100 rpm, 1666.43 g of a 5N sodium hydroxide aqueous solution was slowly added thereto to neutralize the polymer. The aqueous solution obtained by the neutralization was mixed with ion-exchanged water to adjust a solid content of the solution to 20%, thereby obtaining a neutralized aqueous solution of the polyacrylic acid dispersant.

Then, a 2 L plastic reaction vessel was charged with 30.0 g of the thus obtained neutralized aqueous solution of the polyacrylic acid dispersant, 300 g of C.I. Pigment White 6 (P.W. 6; titanium oxide "CR80") available from ISHIHARA SANGYO KAISHA, LTD., and 306 g of water. Then, 1000 g of zirconia beads were added to the reaction vessel, and the contents of the reaction vessel were dispersed for 8 hours using a bench top-type pot mill pedestal available from AS ONE Corporation. Thereafter, the resulting dispersion was filtered through a metal mesh to remove the zirconia beads from the resulting dispersion, and then ion-exchanged water was added to the dispersion to adjust a solid content thereof to a desired value, thereby obtaining a water dispersion of white pigment-containing polymer particles (solid content: 30% by mass). The average particle size of the white pigment in the resulting water dispersion was 270 nm. The results are shown in Table 1.

TABLE 1

Water Dispersion of Pigment-Containing Polymer Particles

| | | Production Example 2 | Production Example 3 | Production Example 4 | Production Example 5 | Production Example 6 |
|---|---|---|---|---|---|---|
| Water dispersion | Kind of pigment | Black | Cyan | Magenta | Yellow | White |
| | | P.B. 7 | P.B. 15:3 | P.R. 150 | P.Y. 74 | P.W. 6 |
| | Solid content (%) | 22.00 | 22.00 | 22.00 | 22.00 | 30.00 |
| | Ratio of pigment introduced (%) | 68.76 | 68.52 | 68.52 | 68.52 | 98.00 |

TABLE 1-continued

Water Dispersion of Pigment-Containing Polymer Particles

| | | | Production Example 2 | Production Example 3 | Production Example 4 | Production Example 5 | Production Example 6 |
|---|---|---|---|---|---|---|---|
| Composition (part(s) by mass) | Pigment (A) | | 15.13 | 15.08 | 15.08 | 15.08 | 29.40 |
| | Pigment dispersing polymer (B-1) | Polymer obtained in Production Example 1 | 6.48 | 6.46 | 6.46 | 6.46 | — |
| | | "ARON AC-10SL" | — | — | — | — | 0.60 |
| | | "DENACOL EX 321L" | 0.39 | 0.46 | 0.46 | 0.46 | — |
| | | Ion-exchanged water | 78.00 | 78.00 | 78.00 | 78.00 | 70.00 |
| | | Total | 100.00 | 100.00 | 100.00 | 100.00 | 100.00 |
| Properties | Viscosity (mPa · s) | | 4.2 | 3.9 | 4.2 | 4 | 3.1 |
| | pH | | 9.9 | 9.8 | 9.9 | 9.9 | 7.1 |
| | Average particle size (nm) | | 100 | 100 | 155 | 115 | 270 |

Production Example 7 (Production of Water Dispersion of Fusing Aid Polymer Particles)

A 1000 mL separable flask was charged with 145 parts of methyl methacrylate available from Wako Pure Chemical Industries, Ltd., 50 parts of 2-ethylhexyl acrylate available from Wako Pure Chemical Industries, Ltd., 5 parts of methacrylic acid available from Wako Pure Chemical Industries, Ltd., 18.5 parts of "LATEMUL E118B" (emulsifier; active ingredient content: 26%) available from Kao Corporation, 96 parts of ion-exchanged water and potassium persulfate available from Wako Pure Chemical Industries, Ltd., and the content of the flask were stirred using an agitation blade (300 rpm), thereby obtaining a monomer emulsion.

A reaction vessel was charged with 4.6 parts of "LATEMUL E118B", 186 parts of ion-exchanged water and 0.08 part of potassium persulfate, and an inside atmosphere of the reaction vessel was fully replaced with a nitrogen gas. In a nitrogen atmosphere, the contents of the reaction vessel were heated to 80° C. while stirring with an agitation blade (200 rpm), and then the aforementioned monomer emulsion was charged into a dropping funnel and added dropwise into the reaction vessel over 3 hours to allow the monomer emulsion to react with the contents of the reaction vessel. The concentration of the fusing aid polymer particles as solid components in the resulting water dispersion of the fusing aid polymer particles was 41.6% by weight, and the average particle size of the fusing aid polymer particles was 100 nm.

Production Example 8 (Production of Black Ink)

A mixed solution was prepared by mixing 508.9 g of the water dispersion of the black pigment-containing polymer particles (solid content: 22.0% by mass) obtained in Production Example 2, 48.3 g of the water dispersion of the fusing aid polymer particles (solid content: 41.6% by weight) produced in Production Example 7, 44.0 g of diethylene glycol monoisobutyl ether (b.p. 230° C.), 286.0 g of propylene glycol (b.p. 188° C.), 5.5 g of a silicone-based surfactant "KF-6011" (polyether-modified silicone; HLB: 14.5) available from Shin-Etsu Chemical Industry Co., Ltd., and 207.3 g of ion-exchanged water with each other. The resulting mixed solution was filtered through a filter "Minisart Syringe Filter" (pore diameter: 5.0 μm; material: cellulose acetate) available from Sartorius Inc., thereby obtaining a black water-based ink. Various properties of the resulting black water-based ink are shown in Table 2.

Production Examples 9 to 11 (Production of Cyan Ink, Magenta Ink and Yellow Ink)

The same procedure as in Production Example 8 was repeated except that the water dispersion of the black pigment-containing polymer particles was replaced with the respective water dispersions of the cyan pigment-, magenta pigment- and yellow pigment-containing polymer particles obtained in Production Examples 3 to 5, respectively, and the production conditions used therein were changed as shown in Table 2, thereby obtaining cyan, magenta and yellow water-based inks. The results are shown in Table 2.

Production Example 12 (Production of White Ink)

A mixed solution was prepared by mixing 374.2 g of the water dispersion of the white pigment-containing polymer particles (solid content: 30.0% by mass) obtained in Production Example 6, 132.3 g of the water dispersion of the fusing aid polymer particles (solid content: 41.6% by weight) produced in Production Example 7, 44.0 g of diethylene glycol monoisobutyl ether (b.p. 230° C.), 286.0 g of propylene glycol (b.p. 188° C.), 5.5 g of a silicone-based surfactant "KF-6011" (polyether-modified silicone) available from Shin-Etsu Chemical Industry Co., Ltd., and 235.3 g of ion-exchanged water with each other. The resulting mixed solution was filtered through a filter "Minisart Syringe Filter" (pore diameter: 5.0 μm material: cellulose acetate) available from Sartorius Inc., thereby obtaining a white water-based ink. Various properties of the resulting white water-based ink are shown in Table 2.

TABLE 2

Water-Based Ink

| | | | Water-Based Inks | | | | |
|---|---|---|---|---|---|---|---|
| | | | Production Example 8 | Production Example 9 | Production Example 10 | Production Example 11 | Production Example 12 |
| | Kind of ink | | Black | Cyan | Magenta | Yellow | White |
| Ink composition | Black pigment-containing water dispersion | part(s) by mass | 508.9 | — | — | — | — |
| | Cyan pigment-containing water dispersion | part(s) by mass | — | 510.8 | — | — | — |
| | Magenta pigment-containing water dispersion | part(s) by mass | — | — | 510.8 | — | — |
| | Yellow pigment-containing water dispersion | part(s) by mass | — | — | — | 510.8 | — |
| | White pigment-containing water dispersion | part(s) by mass | — | — | — | — | 374.2 |
| | Water dispersion of fusing acid polymer particles | part(s) by mass | 48.3 | 47.2 | 47.2 | 47.2 | 132.3 |
| | Propylene glycol (C) | part(s) by mass | 286.0 | 286.0 | 286.0 | 286.0 | 286.0 |
| Ink composition | Diethylene glycol monoisobutyl ether (C) | part(s) by mass | 44.0 | 44.0 | 44.0 | 44.0 | 44.0 |
| | Silicone-based surfactant (D) | part(s) by mass | 5.5 | 5.5 | 5.5 | 5.5 | 5.5 |
| | 1N NaOH aqueous solution | part(s) by mass | — | — | — | — | 22.8 |
| | Ion-exchanged water | part(s) by mass | 207.3 | 207.3 | 207.3 | 207.3 | 235.3 |
| Content of pigment (A) | | % | 7.0 | 7.0 | 7.0 | 7.0 | 10.0 |
| Content of polymer (B) | | % | 5.0 | 5.0 | 5.0 | 5.0 | 5.2 |
| Content of high-boiling organic solvent (C) | | % | 30.0 | 30.0 | 30.0 | 30.0 | 30.0 |
| Properties | Average particle size | nm | 101.0 | 105.0 | 157.0 | 112.0 | 265.0 |
| | Viscosity at 32° C. | mPa·s | 5.5 | 5.1 | 5.3 | 5.2 | 5.7 |
| | Static surface tension | mN/m | 28.7 | 28.1 | 28.5 | 28.1 | 27.5 |
| | pH | — | 9.2 | 9.3 | 9.5 | 9.0 | 8.8 |

Example 1

Using the respective water-based inks, characters or images were printed onto a corona discharge-treated PET "TAIKO Polyethylene Terephthalate Film FE2001" having a thickness of 25 μm available from Futamura Chemical Co, Ltd., by the following ink-jet printing method to thereby obtain a printed material.

(Ink-Jet Printing Method)

Under the environmental conditions of a temperature of 25±1° C. and a relative humidity of 30±5%, the water-based inks were loaded into a print evaluation apparatus available from Trytech Co., Ltd., equipped with line-type ink-jet printing heads "KJ4B-HD06MHG-STDV" (piezoelectric type) available from Kyocera Corporation. At this time, the line-type printing head loaded with the black ink, the line-type printing head loaded with the cyan ink, the line-type printing head loaded with the magenta ink, the line-type printing head loaded with the yellow ink and the line-type printing head loaded with the white ink were sequentially disposed in this order at the intervals of 55 cm in the print evaluation apparatus.

The operating conditions of the print evaluation apparatus were set to a head applied voltage of 26 V, a drive frequency of 20 kHz, an ejected ink droplet amount of 5 pL, a head temperature of 32° C., a head resolution of 600 dpi, a number of ink shots for flashing before being ejected of 200 shots and a negative pressure of −4.0 kPa, and the printing medium was disposed in the print evaluation apparatus such that the longitudinal direction of the printing medium was aligned with a transporting direction thereof.

The distance between each of the under heaters and the printing medium was set to 0.25 mm, and the distance between each of the ink-jet printing heads and the printing medium was set to 1.0 mm. The temperature of the surface of the respective under heaters was set to 55° C. (at which the temperature of the surface of the printing medium was 50° C.). The temperature of hot air of the afterheater was set to 60° C. In the region in which a tension force was applied to the printing medium, the printing medium was out of contact with the other members than the rolls.

Then, a printing command was transmitted to the aforementioned print evaluation apparatus, and the printing medium was transported at a transportation speed of 50 m/min to print a 100% Duty solid image of the black ink having a size of 5 cm×5 cm, a 100% Duty solid image of the cyan ink having a size of 5 cm×5 cm, a 100% Duty solid image of the magenta ink having a size of 5 cm×5 cm, a 100% Duty solid image of the yellow ink having a size of 5 cm×5 cm and a 100% Duty solid image of the white ink having a size of 5 cm×5 cm on the printing medium such that these images were not overlapped from each other, thereby obtaining a printed material.

The occurrence of color migration and formation of flaw on the resulting printed material were evaluated according the following evaluation ratings. The results are shown in Table 3.

(Evaluation of Occurrence of Color Migration on Printed Material)

A: No color migration occurred when rubbing the surface of the resulting printed material with fingers.

B: Slight color migration occurred when rubbing the surface of the resulting printed material with fingers, but there were present no significant problems on the printed material even when used in practical applications.

C: Much color migration occurred when rubbing the surface of the resulting printed material with fingers, and the printed material got wet on its surface and therefore suffered from significant problems when used in practical applications.

(Evaluation of Formation of Flaw on Printed Material)

A: No formation of flaw on the resulting printed material was recognized when visually observed.

B: Formation of a slight amount of flaw on the resulting printed material was recognized when visually observed, but there were present no significant problems even when used in practical applications.

C: Formation of a large amount of flaw on the resulting printed material was recognized when visually observed, and there were present significant problems when used in practical applications.

Examples 2 and 3 and Comparative Examples 1 and 2

The same procedure as in Example 1 was repeated except that the temperature of the respective under heaters, the temperature of the surface of the printing medium and the distance between each of the under heaters and the printing medium were changed as shown in Table 3. The results are shown in Table 3.

TABLE 3

| | | | Examples | | | Comparative Examples | |
|---|---|---|---|---|---|---|---|
| | | | 1 | 2 | 3 | 1 | 2 |
| Water-based ink (5 colors*1) | | | 5 colors | 5 colors | 5 colors | 5 colors | 5 colors |
| Content of high-boiling organic solvent (C) in water-based ink | | % | 30.0 | 30.0 | 30.0 | 30.0 | 30.0 |
| Temperature of surface of printing medium upon printing | | °C. | 50 | 50 | 50 | 50 | 50 |
| Conditions of under heaters | Temperature of each under heater | °C. | 55 | 60 | 60 | 60 | 50 |
| | Temperature of surface of printing medium | °C. | 50 | 50 | 45 | 30 | 50 |
| | Distance between each under heater and printing medium | mm | 0.25 | 0.50 | 1.00 | 5.00 | 0.00 |
| Evaluation of printed material | Color migration | — | A | A | B | C | A |
| | Surface flaw | — | A | A | A | A | C |

NOTE
*1Water-based inks of 5 colors including a black color, a cyan color, a magenta color, a yellow color and a white color From Table 3, it was confirmed that the printed materials obtained in Examples 1 to 3 were free of occurrence of color migration and formation of flaw on the surface thereof, and exhibited good appearance as compared to the printed materials obtained in Comparative Examples 1 and 2.

INDUSTRIAL APPLICABILITY

According to the ink-jet printing apparatus and the ink-jet printing method of the present invention, it is possible to obtain printed materials that are free of occurrence of color migration and have good appearance even when printed on a resin printing medium using a water-based ink.

REFERENCE SIGNS LIST

10: Ink jet printing apparatus
12K, 12C, 12M, 12Y, 12W: Printing heads
13: Head-distance adjusting mechanisms
16: Printing medium
20: Fusing/curing means
24: Afterheater
26: Under heaters
27: Temperature measuring devices
32, 34: Turning rollers
61: Web roll heating/supporting mechanism
62: Take-up mechanism
71: Feeding side tension mechanism
72: Take-up side tension mechanism
90: Heating amount control device

The invention claimed is:

1. An ink-jet printing apparatus comprising:
   an ink-jet printing head that ejects a water-based ink onto a resin printing medium that is transported in a feeding direction thereof; and
   an under heater that heats the printing medium from a rear side surface of the printing medium opposed to a front side surface thereof which faces to the ink-jet printing head,
   in which the under heater is disposed at a position spaced at a distance of not less than 0.05 mm and not more than 3.0 mm apart from the rear side surface of the printing medium upon printing.

2. The ink-jet printing apparatus according to claim 1, further comprising a pair of support rolls for supporting the printing medium,
   in which the under heater is disposed between one of the pair of support rolls and the other of the pair of support rolls in the feeding direction of the printing medium, and
   upon printing, the under heater is disposed at a position spaced apart from a tangential plane to both of an outer cylindrical side surface of the one of the pair of support rolls and an outer cylindrical side surface of the other of the pair of support rolls.

3. The ink-jet printing apparatus according to claim 1, wherein upon printing, a distance between the ink-jet printing head and the printing medium is not less than 0.1 mm and not more than 3.0 mm.

4. The ink-jet printing apparatus according to claim 1, wherein a plurality of ink-jet printing heads are disposed in the ink-jet printing apparatus, and the ink-jet printing apparatus further comprises a fusing/curing means between adjacent two of the plurality of ink-jet printing heads.

5. The ink-jet printing apparatus according to claim 1, wherein the resin printing medium is a polyester film that is subjected to corona discharge treatment, or a stretched polypropylene film.

6. The ink-jet printing apparatus according to claim 1, wherein a thickness of the resin printing medium is not more than 100 μm.

7. The ink-jet printing apparatus according to claim 1, wherein a temperature of the under heater upon printing is not lower than 35° C. and not higher than 75° C.

8. The ink-jet printing apparatus according to claim 1, wherein a content of an organic solvent having a boiling point of not lower than 90° C. and lower than 250° C. in the water-based ink is not less than 15% by mass and not more than 45% by mass.

9. An ink-jet printing method comprising the step of ejecting a water-based ink onto a resin printing medium using a printing apparatus to print characters or images on the printing medium,
  said printing apparatus comprising an ink-jet printing head that ejects the water-based ink onto the resin printing medium that is transported in a feeding direction thereof; and an under heater that heats the printing medium from a rear side surface of the printing medium opposed to a front side surface thereof which faces to the ink-jet printing head,
  in which the under heater is disposed at a position spaced at a distance of not less than 0.05 mm and not more than 3.0 mm apart from the rear side surface of the printing medium upon printing.

* * * * *